United States Patent [19]
Johnson

[11] 3,797,554
[45] Mar. 19, 1974

[54] PET DOOR STRUCTURE

[76] Inventor: Frances H. Johnson, P.O. Box 643, Northridge, Calif. 91324

[22] Filed: June 9, 1972

[21] Appl. No.: 261,193

[52] U.S. Cl. .............................. 160/354, 160/DIG. 7
[51] Int. Cl. ............................................. E06b 3/80
[58] Field of Search ...... 160/DIG. 7, 179, 180, 189, 160/354, 368, 370, 392, 395; 119/16, 17, 18, 19, 29; 49/169, 397

[56] References Cited
UNITED STATES PATENTS

| | | | |
|---|---|---|---|
| 2,758,646 | 8/1956 | Johnson | 160/354 |
| 2,877,840 | 3/1959 | Hurowitz et al. | 49/397 |
| 2,717,036 | 9/1955 | Harris | 160/354 |
| 2,755,484 | 7/1956 | Hotz | 160/392 |
| 2,495,830 | 1/1950 | Wagner | 49/397 |

Primary Examiner—Peter M. Caun
Attorney, Agent, or Firm—Jessup & Beecher

[57] ABSTRACT

A pet door structure having an open frame to which is swingingly secured a door, the upper edge of the frame comprising an elongated element which is cane shaped in cross-section, the free end of the cane shaped element extending toward the interior of said frame, a first connection means located between the door and the frame adjacent the upper surface of the door permitting such to swing loose in either direction with respect to the frame, a substantially U-shaped border element attached to the elongated element by a second connecting means, the border element to swing only in one direction along with the door and remain in contact with the frame during swinging movement of the door in the opposite direction.

5 Claims, 5 Drawing Figures

PATENTED MAR 19 1974 3,797,554
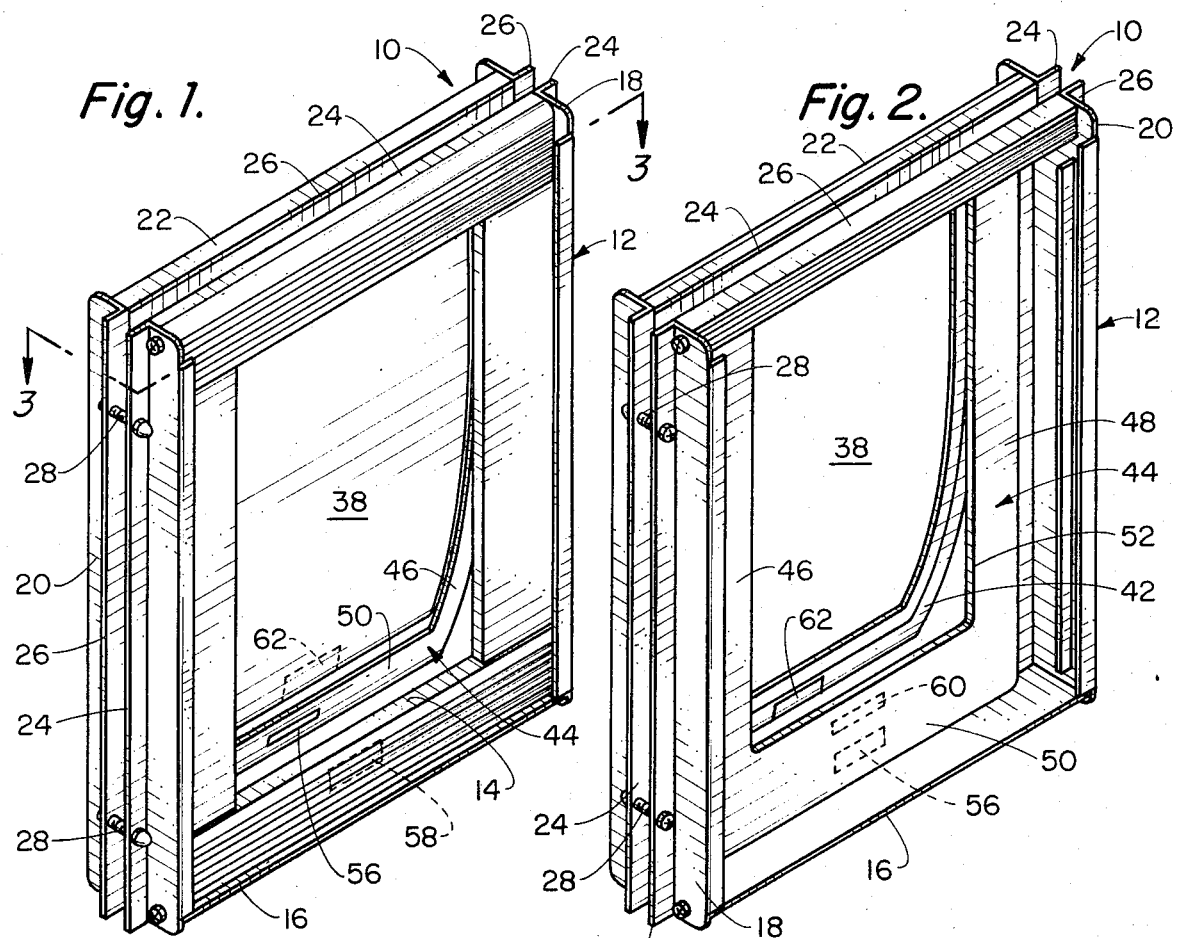
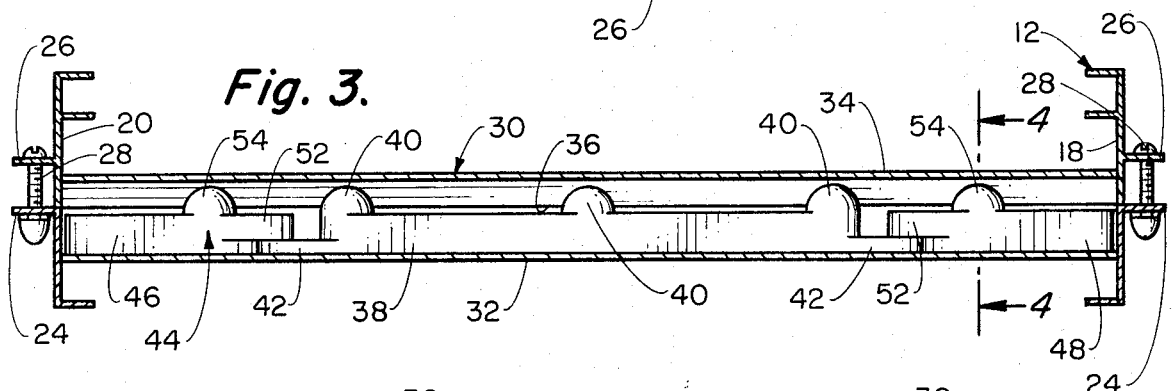
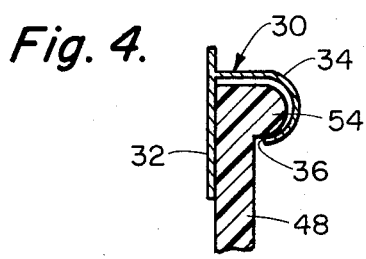
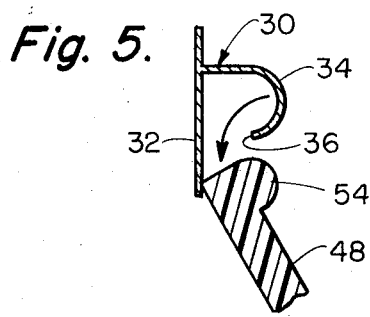

PET DOOR STRUCTURE

BACKGROUND OF THE INVENTION

The field of this invention relates to a door apparatus particularly adapted for the passage of small animals such as dogs and cats, and more particularly to a door apparatus located within a house or other human being living structure which gives a relatively small domesticated animal indoor or outdoor freedom of movement.

The apparatus of this invention constitutes an improvement upon the pet door apparatus defined within U.S. Pat. No. 2,758,646, patented Aug. 14, 1956, entitled Door Structure by Don D. Johnson.

It is the objective of all pet doors as defined in the foregoing patent to adequately keep out the elements while still permitting the passage of small animals therethrough without human assistance. The door structure defined by the above referred to patent and patent application satisfactorily accomplishes the objective of not permitting the elements to enter the house while also giving the animal freedom of movement. However, the door structure of the previously enumerated patent are normally configured to be large enough to be used by a medium size or large size dog.

Small dogs are reluctant to use the large size pet door apparatus mainly because the door is of a size and weight that it makes it difficult for them to effect opening of the door. Additionally, another disadvantage of such large size doors is that the larger the door opening, the easier unauthorized access is made to within the dwelling. The doors which are designed for especially large animals may be sufficiently large enough for a small person or child to gain access to within the dwelling. Even if the opening itself is not large enough to permit access of the unauthorized person, the person may frequently extend his arm through the opening and cause unlocking of a door or window.

It would be desirable to design a pet door structure which would be easily usable by toy dogs and cats. Additionally, it is desirable to employ a pet door structure design which readily facilitates manufacturing of the structure.

SUMMARY OF THE INVENTION

The structure of this invention is basically similar to the door structure shown and described in the aforesaid patent. The door structure of this invention employs a frame with the upper surface of the frame being formed into an elongated channel-like strip which is basically cane shaped in cross-sectional configuration. The open end of the cane is located downwardly or inwardly toward the interior of the door structure. The door structure includes a door which includes a first connecting means located upon the upper edge thereof. The upper edge of the door is to cooperate with the elongated element so that the first connecting means is retained within the element and normally prevents removal thereof. The first connecting means is to normally comprise a plurality of protuberances formed adjacent the upper edge of the door. A border element is to be employed which surrounds the door with the ends of the legs of the U-shaped border element to be connected by a second connecting means to the elongated element. The second connecting means comprises a single protuberance located adjacent the free edge of each of the legs. The elongated element and its connected door and border element are to be located within a frame. The door and the border element are thereby held in position and accidental dislodgment from the frame is prevented. Additionally, the door is free to swing either inwardly or outwardly with respect to the frame.

BRIEF DESCRIPTION OF THE DRAWING

FIG. 1 is a front perspective view of the apparatus of this invention;

FIG. 2 is a back perspective view of the apparatus of this invention;

FIG. 3 is a partly-in-section view through the structure of this invention taken along line 3—3 of FIG. 1;

FIG. 4 is a fragmentary, partly-in-section view taken along line 4—4 of FIG. 3; and FIG. 5 is a view depicting possible removal of the legs of the border element from the elongated element during use to prevent injury to the animal.

DETAILED DESCRIPTION OF THE SHOWN EMBODIMENT

Referring particularly to the drawing, there is shown in FIG. 1 a structure 10 of this invention including a rectangularly shaped frame 12 which includes a rectangularly shaped opening 14 therein. The opening 14 is to be of sufficient size so as to readily permit a domesticated small animal such as a toy dog or cat to pass therethrough. It is to be understood that although the structure 10 of this invention is primarily designed to be employed by means of a toy dog or a cat, it is to be considered to be within the scope of this invention to employ the structure for larger sized animals.

The frame 12 comprises a lower plate 16 which is fixedly secured to side plates 18 and 20. An upper plate 22 is also connected between the side plates 18 and 20. Each of the plates 16, 18, 20 and 22 include a pair of spaced apart flanges 24 and 26. Frame 12 also includes, fixed therewithin, a U-shaped jamb consisting of legs 17 and 19 joined at the bottom by a crosspiece 21. Fasteners 28 are to cooperate between the flanges 24 and 26 and are to function to hold the frame 12 within a fixed structure. Normally, the fixed structure would constitute the living quarters for a human being. For example, the frame 12 could be secured within an opening of a wall of a house or apartment, or the frame 12 could be located within a cut-out opening within a door of a house or apartment. It is normally desirable that the structure 10 of this invention be mounted so as to be spaced a predetermined distance from the floor. However, this predetermined distance is to be variable depending on the size of the animal which is to pass therethrough.

An elongated element 30 is adapted to be secured between the side plates 18 and 20 and directly below the upper plate 22. The elongated element 30 is to be fixedly secured to the side plates 18 and 20 by means of a fastening means (not shown). An elongated element 30 includes a base plate 32 with a member 34 extending perpendicularly therefrom. The member 34 is basically U-shaped in configuration with the lower leg of the member 34 being removed resulting in the forming of elongated opening 36. As the result, member 34 assumes a generally cane shaped cross-sectional configuration.

A door 38 is to be formed of a substantially homogeneous sheet of flexible material such as thick rubber, natural or synthetic. Flexible plastic material may also be used. Located adjacent the upper edge of the door 38 is a first connecting means which comprises a plurality of spaced apart protuberances 40. The upper edge of the door 38 along with the protuberances 40 are adapted to slide transversely within the elongated element 30 through the opening 36. The size of the protuberances 40 are selective so that secure retention of the door 38 within the elongated element results. It is to be understood that the door 38 is installed prior to the installation of the member 30 between the side plates 18 and 20. Integrally formed upon the door 38 about its periphery is a flanged area 42. The flanged area 42 is substantially less thick than the thickness of the door 38.

A border element 44 is to be employed which is basically U-shaped in configuration resulting in the forming of a first leg 46 which is substantially parallel to the second leg 48 with a connecting element 50 being connected therebetween. The border element 44 is also to be constructed of a material similar to the door 38. Surrounding interiorly of the border element 44 is a flanged area 52. The flanged area 52 is of a substantially less thickness than the thickness of the border element 44. The flanged area 52 is overlap the flanged area 42 located upon the door 38. It is to be understood that the border element 44 is to surround on three sides the door 38.

Secured directly adjacent the upper edge of each of the legs 46 and 48 is a second connecting means. The second connecting means comprises a protuberance 54 located upon each of the legs 46 and 48. These protuberances 54 are basically similar to the protuberances 40. It is to be understood that there could be more than one protuberance employed upon each of the legs if desired or the protuberances upon the legs of the border element could be made of a different size than the protuberances 40.

Each of the legs 46 and 48 are to be installed within the elongated element 30 after installation of the door 38. It is to be further understood that upon connecting of the elongated element 30 between the sides 18 and 20, that accidental dislodgment will be prevented by cooperation of the protuberances 54 within the member 34.

While it is envisioned that the protuberances 40 and 54 will be located on both the door and the border element, it is considered to be within the scope of this invention to have the retaining means of the elongated element 30 of the frame to include protuberances 40 and 54 to hold the door and the border element in position. In other words, both the door and the border element will be unmodified with the protuberances 40 and 54 or some other type of binding structure located upon the elongated element 30.

It is normally desirable that with the structure 10 in the operative position, that the border element 44 be held by a slight force in cooperation with the frame 12. This holding action can be readily accomplished by the use of a magnet 56 which is embedded within the border element 44. It is normally envisioned that the frame 12 be made of a non-magnetic material such as aluminum. Therefore, a strip of magnetic material 58 will be located upon the crosspiece 21 forming part of the frame 12 in a position so as to cooperate with the magnet 56 of the border element 44 when the door is in a closed position.

Additionally, with the door closed, it is desirable that the door 38 be held so that the flanged area 42 abuts the flanged area 52. This can be readily accomplished by locating a magnet 60 within the member 50 of the border element 44. The magnet 60 is to cooperate with a strip 62 of magnetic material which has been embedded within the door 38. although magnets are found to be particularly desirable in creating this slight holding action, it is considered to be within the scope of this invention to employ retaining means other than magnets.

The operation of the structure 10 of this invention is as follows: It will be assumed that the structure 10 has been mounted in a structure such as a wall of a house or a door of a house. For the animal to pass through the structure 10 from the inside of the house to the outside of the house, the animal contacts the door 38 and physically overcomes the force created by the magnet 56 and causes the door to swing outwardly along with the border element 44 permitting the animal to pass through the opening 14 and therefore exteriorly of the house. If the animal then wishes to come within the house, the animal need only to physically contact the opposite side of the door 38, over-powering the magnet 60 and causing the door to swing inwardly permitting the animal to pass through the opening 14 to the interior of the house. It is to be noted that during the inward movement the border 44 is maintained in contact with the frame 12.

Let it be assumed that in an unusual situation the flanged areas 42 and 44 have become disassociated with one another causing the door 38 to be partially moved on the opposite side of the border element 44. This situation can occur if the animal strikes the door 38 in an outward direction with substantial force. Let it further be assumed that the animal has become caught between the lower edge of the door 38 and the connecting member 50 of the border element 44. Under normal circumstances, whatever the animal would attempt to do would only tend to make matters worse by increasing the binding force between the door 38 and the connecting member 50. The normal reaction for the animal is to run away or to exert a greater force tending to separate the border element 44 from the frame 12. It is envisioned that the size of the protuberances 54 have been preselected so that upon exerting of this abnormal force that the border element 44 will be removed from the elongated element 30 (note particularly FIG. 5). As a result, the border element 44 is completely removed thereby freeing the animal. Reinstallation of the border element 44 within the elongated member can be easily effected without a removal of the elongated member 30 from the frame 12. Once the border element has been replaced, it will remain in this position until such again encounters an abnormal force situation.

The door 38 and the border 44 are permitted to move a slight amount within the element 30. This adjustable feature causes the door 38 and border 44 to be "self centering." During use, the door 38 and border 44 will assume a non-stressed position permitting the door and border to swing most freely.

What is claimed is:

1. A pet door structure comprising:

a frame having a central opening to permit passage of an animal therethrough, said frame including an elongated element having retaining means;

a door having an edge thereof to engage said elongated element, a first connecting means mounted upon said door and located between said elongated element and said edge of said door, said first connecting means to cooperate with said retaining means to swingably mount said door in both the fore and aft directions;

a border element to surround said door, said border element connected to said door to be movable along with said door in the aft direction, said border element being U-shaped having a first leg which is substantially parallel to a second leg which are connected together through a connecting member, said door to be positioned between said legs, a second connecting means mounted upon said border element and located between the free end of each of said legs and said elongated element, said second connecting means comprising at least one first protuberance upon each said leg to cooperate with said retaining means to swingably mount said border element in the aft direction, upon said border element being struck with excessive force, said second connecting means being designed to disassociate from said retaining means thereby causing removal of said border element from said frame.

2. Structure as defined in claim 1 wherein:

said elongated element having an upper elongated surface and a lower elongated surface, said lower elongated surface located directly adjacent said central opening, said retaining means includes an elongated opening within said lower surface, the width of said elongated opening being slightly greater than the width of said door and said border element.

3. Structure as defined in claim 2 wherein:

the cross-sectional configuration of said elongated element being substantially cane shaped, said retaining means further including the interior of the arcuate portion of said cane shaped element.

4. Pet door structure as defined within claim 3 wherein:

said second connecting means comprises a plurality of second protuberances, with said door located within said frame said second protuberances to be located in the interior of said arcuate portion of said elongated element thereby preventing accidental dislodgement of said door from said element.

5. Structure as defined within claim 4 wherein:

each of said first protuberances to cooperate interiorly of said arcuate portion of said elongated element thereby preventing dislodgement of said border element from said frame during normal use, the size of each said first protuberance being selected in view of the width of said elongated opening in said lower surface of said elongated element to thereby permit said removal of said border element from said frame.

* * * * *